Sept. 1, 1931.                      H. E. BUC                      1,820,907
          PROCESS FOR SEPARATION OF OXYGEN CONTAINING MATERIALS
                    FROM THEIR SOLUTIONS IN HYDROCARBONS
                           Filed March 26, 1929
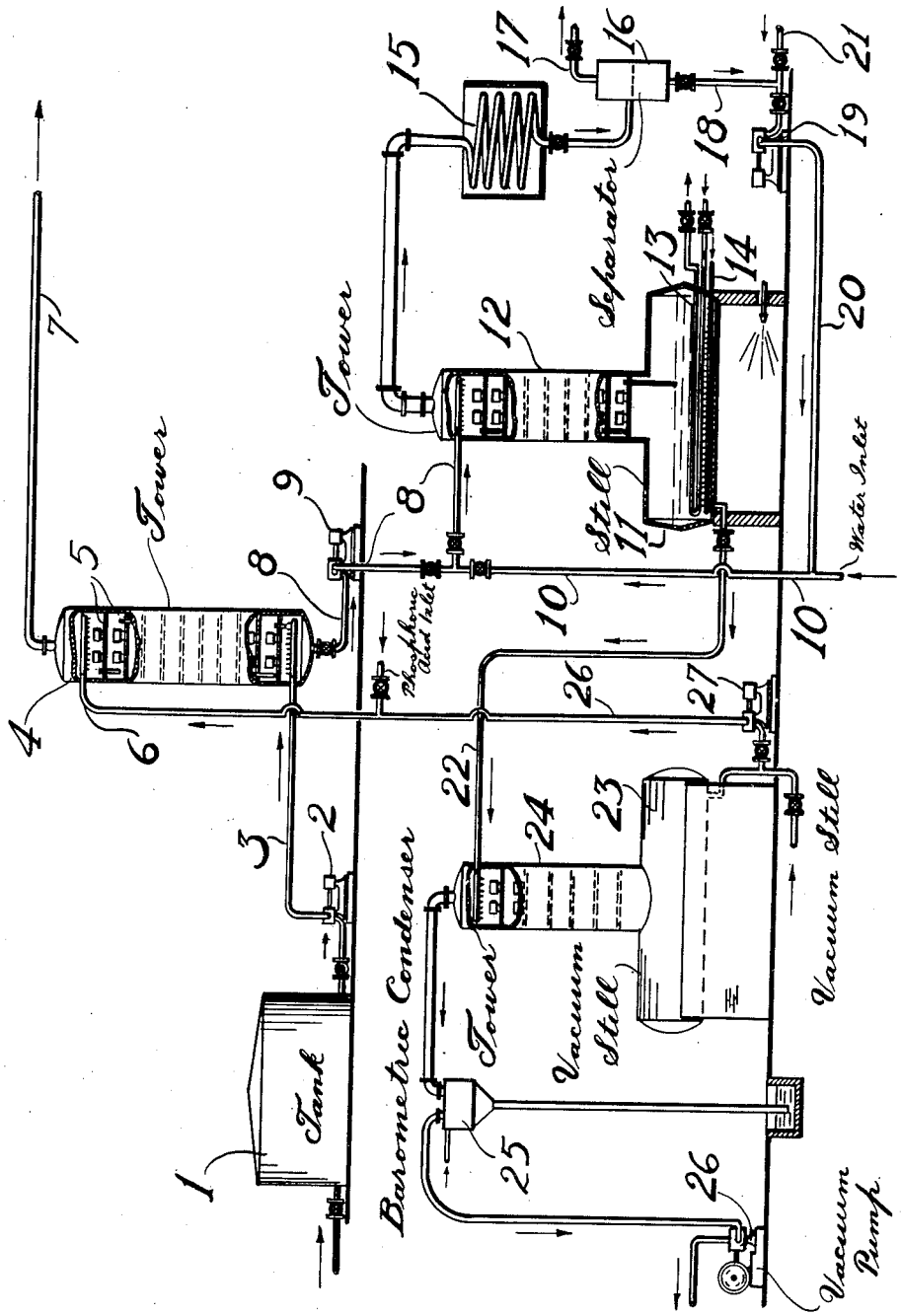
Hyym E. Buc INVENTOR
BY HIS
ATTORNEY Patented Sept. 1, 1931

1,820,907

UNITED STATES PATENT OFFICE

HYYM E. BUC, OF ROSELLE, NEW JERSEY, ASSIGNOR TO STANDARD OIL DEVELOPMENT COMPANY, A CORPORATION OF DELAWARE

PROCESS FOR SEPARATION OF OXYGEN-CONTAINING MATERIALS FROM THEIR SOLUTIONS IN HYDROCARBONS

Application filed March 26, 1929. Serial No. 349,942.

The present invention relates to an improved process for the separation of oxygen-containing products from their solutions in hydrocarbons. My improved process will be fully understood from the following description and the drawing which illustrates one form of apparatus suitable for carrying out my process.

The drawing is a semi-diagrammatic view in sectional elevation of an apparatus constructed according to my invention and indicates the flow of materials.

There is considerable difficulty in the separation of oxygen-containing hydrocarbon derivatives such as alcohols and aldehydes or the mixtures of these with each other and with other similar substances from their solution in hydrocarbon oils in an efficient, economic manner. The separation of alcohols and other oxidation products boiling higher than isopropyl alcohol, such as primary, secondary and tertiary butyl, amyl and hexyl alcohols and the corresponding ketones, esters, ethers, and the like, is particularly difficult since these products are completely miscible with hydrocarbon oil and only sparingly soluble in water. Distillation methods are difficult because of the fact that many hydrocarbons boil in close proximity to the alcohols and further that many constant boiling mixtures are formed which prevent complete separation. My method is applicable to such conditions.

Referring to the drawing, reference character 1 denotes a tank containing a solution of oxygen-containing derivatives of hydrocarbons such as alcohols, aldehydes, acids and the like in hydrocarbon oil. Pump 2 withdraws the solution from tank 1 and forces it thru a pipe 3 into any suitable type of extraction apparatus. A tower 4 is shown for continuous extraction but intermittent or semi-continuous methods may be used as will be understood. The tower is preferably fitted with bell cap plates 5 or other suitable contact packing and the oily solution is discharged into the lower part of the tower. Phosphoric acid or a relatively strong aqueous solution of the same is forced into the top of the tower by pipe 6, so that the two liquids pass in substantially counter-current contact. The acid dissolves the oxygen-containing material from the oil which then flows to storage (not shown) by pipe 7.

The rich phosphoric acid solution of oxygen-containing hydrocarbon derivatives is withdrawn from the base of tower 4 by pipe 8 and pump 9. Water is introduced into line 8 by branch pipe 10 and the diluted solution flows to a suitable still 11 which may be fitted with a tower 12 as shown. The still is preferably heated by closed steam coil 13 and steam may be injected thru a spray pipe 14 as an aid in distillation. Water and the oxygen-containing material is removed as a vapor and condensed in condenser 15 from which the product is discharged to a separator 16. Higher alcohols and other products which form a layer above the water are withdrawn by pipe 17 to storage or for separation into individual components and purification by any preferred means. The aqueous layer may be withdrawn to suitable stills or other equipment for separating the water-soluble products.

Phosphoric acid in a somewhat diluted state is then withdrawn from still 11 and forced into a concentration apparatus by way of line 22. Any preferred type of concentrator may be used, but a vacuum still 23 is shown fitted with a disengaging tower 24 which may or may not be provided. Vapor is conducted from the tower to a barometric condenser 25 and to the vacuum pump 26. The concentrated acid from still 23 is returned to the extraction tower 4 by means of pipe 26 and pump 27.

In the operation of my process, the extraction is made with strong phosphoric acid, 80–85% $H_3PO_4$ by weight being preferable. The acid may be stronger or weaker, but preferably not weaker than corresponding to about 1.65 specific gravity. I have found that such a solvent is extremely efficient and I may use as little as 1 to 1.5 volumes of the acid per volume of pure oxygen-containing compounds and obtain highly efficient extraction, even though the concentration of the oxygen-containing derivatives in hydrocarbons may be small. It appears that the phosphoric acid acts predominately as a solvent for the oxygen-containing hydrocarbon derivatives, although probably some esters are formed with the alcohols. Sometimes it is desirable to add a certain proportion of low boiling oxygen-containing material, such as 5 to 50% by volume of methyl, ethyl, or isopropyl alcohol to the strong phosphoric acid to more completely dissolve the less soluble product such as alcohols above hexyl, esters and the like. It will be understood that it is preferable to make the contact in a counter-current manner, and more acid is required if batch methods are used. If acid weaker than 80-85% is used, a larger quantity of acid is preferable, as will be understood.

The second stage in my process is the dilution and distillation of the acid. I prefer to dilute with about an equal volume of water or in other words to dilute to an acid strength of not greater than 45 or 50% by weight of $H_3PO_4$ as calculated only on the basis of acid and water present and neglecting the alcohol or other organic material present. The acid may be diluted to a greater degree, but it is undesirable since it merely requires the evaporation of more water in reconcentration. The diluted acid is then distilled and a distillate is collected which separates into an aqueous layer and a layer of water-insoluble products such as higher alcohols, esters and the like, if they be present. The upper layer is withdrawn to storage and the oxygen-containing organic compounds may be removed from the aqueous layer, if desired, but it is ordinarily preferable to retain the aqueous layer for the dilution step especially when there are only small quantities of water-soluble products in the feed stock. If only low-boiling, water-soluble products are present, the aqueous layer will be rectified in the usual manner.

The organic substances may be almost completely removed from the aqueous phosphoric acid by distillation and the temperature required is sufficiently low so that steam heating is readily applicable.

Reconcentration of the diluted phosphoric acid may be accomplished at atmospheric pressure in any preferred type of equipment, but for reasons of economy and efficiency I prefer a vacuum concentrator as described. The apparatus must, of course, be made of materials which will withstand the corrosive effects of the acid.

My invention is not to be limited by any theory of the mechanism of the process nor by any example which may be given merely for purposes of illustrations, but only by the following claims in which I wish to claim all novelty inherent in the invention.

I claim:

1. An improved process for removal of oxygen-containing hydrocarbon derivatives from their solutions in hydrocarbons which comprises contacting the solutions with a solvent comprising concentrated phosphoric acid, and separating a layer consisting principally of hydrocarbons from the concentrated phosphoric acid layer containing the removed oxygen containing hydrocarbon derivatives.

2. Process according to claim 1, in which the acid has a concentration higher than that corresponding to a specific gravity of 1.65.

3. Process according to claim 1, in which the acid has a concentration between the limits of about 80 and 85% phosphoric acid by weight.

4. Process according to claim 1, in which the phosphoric acid solution of the oxygen-containing hydrocarbon derivatives is diluted and distilled whereby the oxygen-containing derivatives are obtained as distillate.

5. Process according to claim 1, in which the rich phosphoric acid is diluted to an acid concentration of less than about 45-50% phosphoric acid and the extracted materials are distilled from the diluted acid.

6. Process according to claim 1, in which the solvent comprises concentrated phosphoric acid to which an appreciable quantity of a low-boiling, oxygen-containing, organic material totally miscible with water, is added.

7. Process according to claim 1, in which the solvent comprises concentrated phosphoric acid to which has been added 5 to 50% of an alcohol totally miscible with water.

8. An improved process for the recovery of oxygen-containing hydrocarbon derivatives from their solutions in hydrocarbon oil, comprising dissolving such derivatives in concentrated phosphoric acid, withdrawing undissolved hydrocarbons, diluting the phosphoric acid solution, distilling the extracted materials therefrom, reconcentrating the phosphoric acid and returning the same for solution of a fresh quantity of oxygen-containing substances.

9. Process according to claim 6, in which the extraction is substantially countercurrent.

10. Process according to claim 6, in which the volume of concentrated acid is not greater than about two volumes for each volume of pure oxygen-containing material to be dissolved.

11. Process according to claim 6, in which a part of the water distilled from the diluted phosphoric acid is returned for diluting a further quantity of acid solution.

12. Process according to claim 6, in which the acid is reconcentrated by distillation under reduced pressure.

HYYM E. BUC.